L. SPÄNGLER.
DOUBLE DECKED VEHICLE.
APPLICATION FILED SEPT. 4, 1914.

1,300,201.

Patented Apr. 8, 1919.
4 SHEETS—SHEET 1.

Witnesses.

Inventor,
Ludwig Spängler.
by Wilkinson, Giusta
& MacKaye.
Attorneys.

L. SPÄNGLER.
DOUBLE DECKED VEHICLE.
APPLICATION FILED SEPT. 4, 1914.

1,300,201.

Patented Apr. 8, 1919.
4 SHEETS—SHEET 2.

Witnesses:

Inventor,
Ludwig Spängler.
by Wilkinson, Guesta & MacKaye
Attorneys.

L. SPÄNGLER.
DOUBLE DECKED VEHICLE.
APPLICATION FILED SEPT. 4, 1914.

1,300,201.

Patented Apr. 8, 1919.
4 SHEETS—SHEET 3.

Witnesses.

Inventor,
Ludwig Spängler.
by Wilkinson, Guesta &
MacKaye
Attorneys.

L. SPÄNGLER.
DOUBLE DECKED VEHICLE.
APPLICATION FILED SEPT. 4, 1914.
1,300,201.
Patented Apr. 8, 1919.
4 SHEETS—SHEET 4.
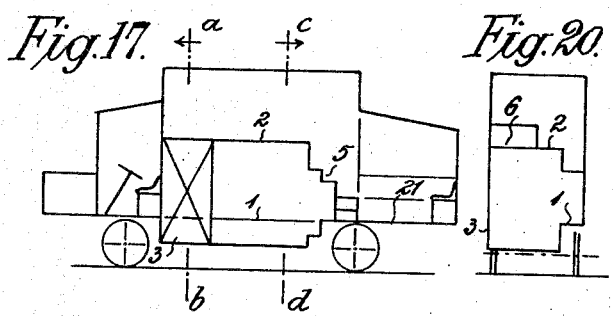
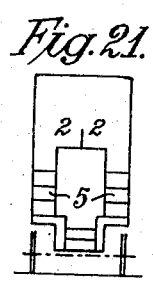
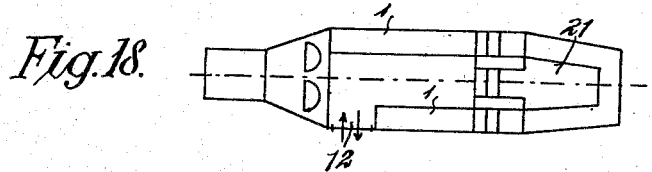
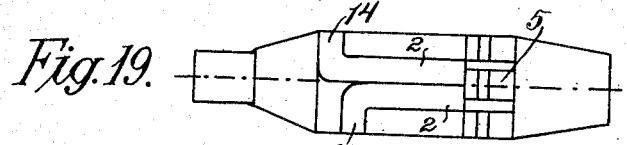
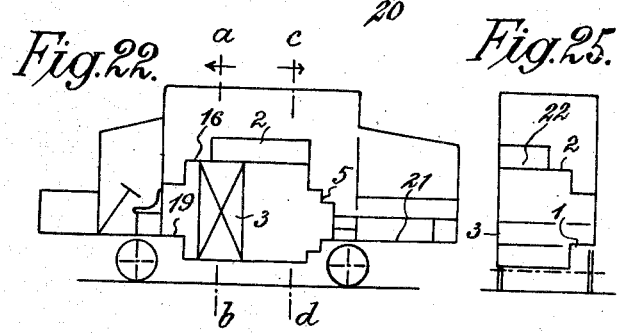
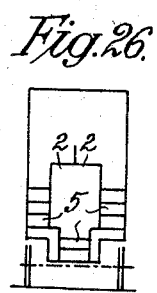
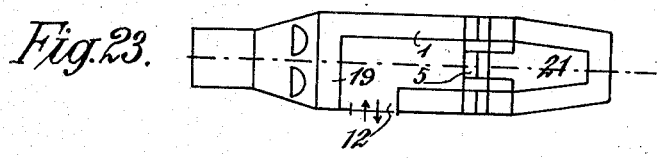
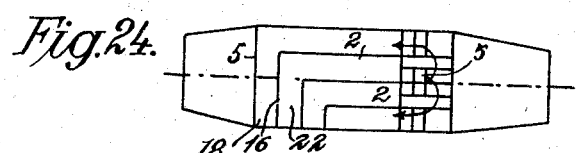
Witnesses:
Inventor,
Ludwig Spängler,
by Wilkinson, Yusta
& MacKaye
Attorneys.

UNITED STATES PATENT OFFICE.

LUDWIG SPÄNGLER, OF VIENNA, AUSTRIA.

DOUBLE-DECKED VEHICLE.

1,300,201.  Specification of Letters Patent.  Patented Apr. 8, 1919.

Application filed September 4, 1914. Serial No. 860,283.

*To all whom it may concern:*

Be it known that I, LUDWIG SPÄNGLER, a subject of the Emperor of Austria, residing at Vienna, Empire of Austria, have invented certain new and useful Improvements in Double-Decked Vehicles; and I do hereby declare the following to be a full, clear, and exact description of the invention, such as will enable others skilled in the art to which it appertains to make and use the same.

The invention relates to double decked vehicles more particularly tramcars and autobuses of that well known class in which longitudinal benches are arranged in the lower deck at the sides of the vehicles with a central longitudinal passageway between them and longitudinal benches arranged back to back in the upper deck, which is provided with a roof and closed side walls, so that in the upper deck two lateral longitudinal passageways are formed between the side walls and the longitudinal double bench.

The floor of the upper deck below this double bench is cut away, whereby the clear height of the central longitudinal passageway is increased, so that passengers may stand and walk upright in this passageway without increasing the total height of the vehicle.

The object of the present invention is to increase the stability of such vehicles by reducing the surface of the side walls of the upper deck exposed to lateral wind pressure and to further facilitate the movements of the passengers on the two decks.

In the accompanying drawings, illustrating diagrammatically various constructional forms of the invention—

Figure 4:
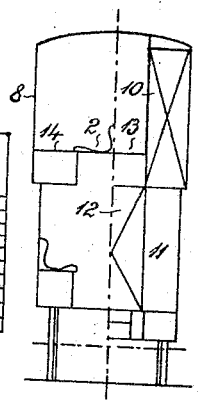
Figure 3:
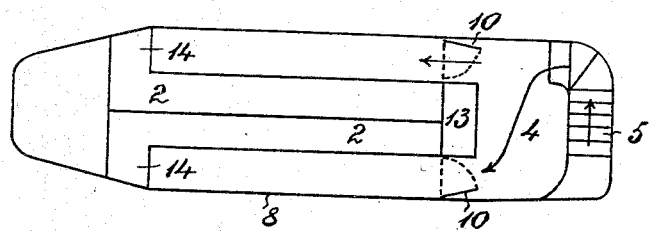
Figure 3:
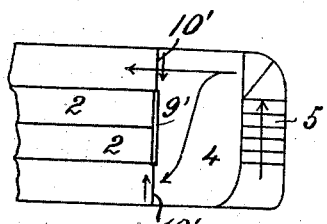
Figure 5:
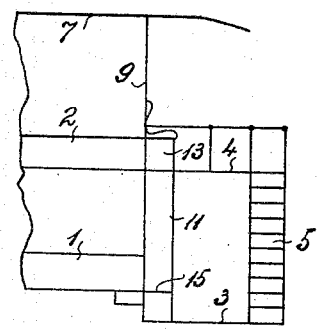
Fig. 5 is a plan of the upper deck.
Figure 8:
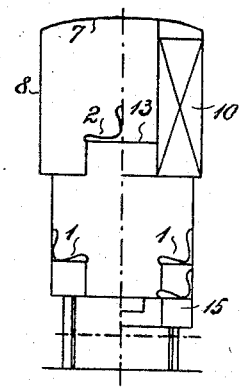
Figure 6:
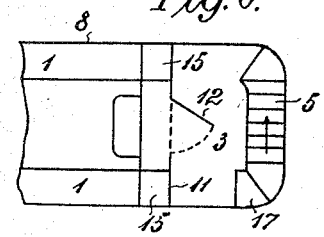
Figure 10:
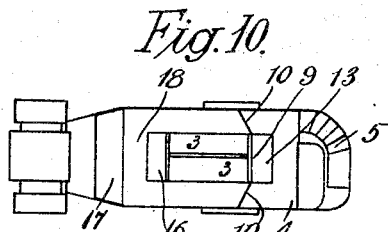
Figure 7:
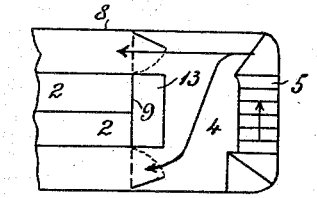
Figure 11:
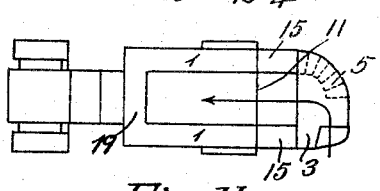
Figures 9, 12:
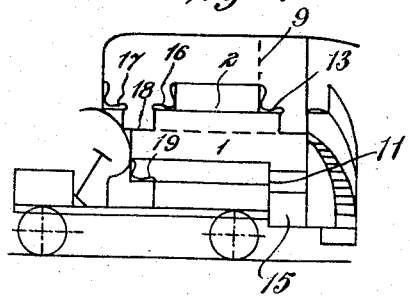
Figure 13:
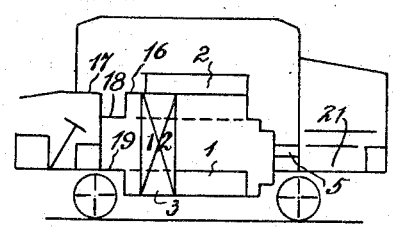
Figure 16:
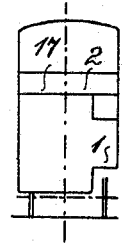
Figure 15:
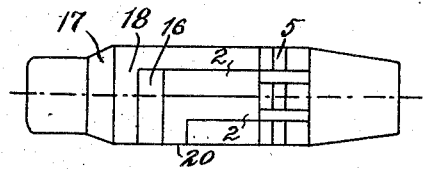
Figure 14:
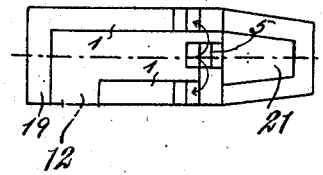

Fig. 3' is a fragmentary plan of the upper deck showing a modification;

Fig. 4 is a sectional rear elevation of the same;

Figs. 5 to 8 are views similar to Figs. 1 to 4, respectively, showing a modification of the rear part of the double decked vehicle;

Figs. 9 to 12 are views similar to Figs. 1 to 4, respectively, showing a further modification of the double decked vehicle;

In Figs. 1 to 12 the entrance and exit door of the lower deck is provided at the rear platform of the same.

Figs. 13 to 16 are views similar to Figs. 1 to 4, respectively, showing a double decked vehicle having the entrance and exit door of the lower deck on the side thereof near its front end;

Fig. 17 is a central longitudinal section of a modification of the double decked vehicle shown in Figs. 13 to 16;

Fig. 18 is a plan view of its lower deck;

Fig. 19 is a plan view of its upper deck;

Fig. 20 is a vertical section on the line *a b* Fig. 17;

Fig. 21 is a vertical section on the line *c d* Fig. 17; and

Figs. 22 to 26 are views similar to Figs. 17 to 21, respectively, showing a further modification.

In all the figures, 1 are the longitudinal benches of the lower deck running along the side walls of the same; 2 are the longitudinal benches of the upper deck located substantially centrally with their backs adjacent to each other; 3 is the rear platform of the lower deck, and 4 is the rear platform of the upper deck. 5 are the stairs leading from the lower deck to the upper deck; 6 are the seats on the motor man's platform. 7 is the roof of the upper deck; 8 its side walls, and 9 its transverse walls. 10 are the doors in the rear transverse wall of the upper deck; 11 is the rear transverse wall of the lower deck and 12 is the door in the latter.

In double decked vehicles, as heretofore constructed (more particularly in tram cars), either the upper deck is entirely inclosed, or the rear transverse wall of the same is arranged close to the upper end of the stairs leading from the lower deck to the upper deck, there being only one entrance and exit door for the upper deck in this rear transverse wall. This known construction involves the long side wall of the upper deck and therefore a comparatively great lateral wind pressure, which should be avoided more particularly in autobuses.

According to the present invention, the rear transverse wall 9 of the upper deck is arranged directly at the rear end of the longitudinal benches 2 of such upper deck, there being provided two exit and entrance doors 10 in this rear transverse wall, one for each of the two longitudinal passageways running along the longitudinal double bench 2 of the upper deck. Thus, a rear platform 4 of considerable area, with open sides is obtained in the upper deck, and the side walls 8 of the latter are correspondingly shortened, whereby the effect of lateral wind pressure is reduced. Moreover, the longitudinal passageways of the upper deck are shortened, which results in facilitating the movement of the passengers in these passageways.
With this construction a transverse bench 13 (Figs. 1 and 3) may be provided on the rear platform 4 of the upper deck, outside the rear wall 9, opposite the rear end of the double bench 2 on the inside of the wall 9 so that the wall 9 forms the back of the transverse bench 13. The length of the latter being equal to the width of the double bench 2, and this bench affords two seats. The doors 10 in this case may be hinged doors, as shown in Fig. 3, there being sufficient space for opening and closing them at the ends of the transverse bench 13; moreover, the feet of the passengers seated on the bench 13 do not interfere with the communication through these doors.

The transverse bench 13 may be dispensed with, and, instead of hinged doors 10, sliding doors 10' may be provided in the rear transverse wall 9 of the upper deck, as shown in Fig. 3'. As such sliding doors do not require any space for opening and closing, the available area of the upper platform 4 is increased. In this case the longitudinal benches 2 of the upper deck may be extended each by one seat at their rear ends, and rear transverse wall of the upper deck may be arranged more to the rearward by the width of one seat, as indicated at 9' in Fig. 3, and in dotted lines in Fig. 1, the numbers of seats of the upper deck is then the same as in the arrangement shown in Fig. 3.

Figure 1:
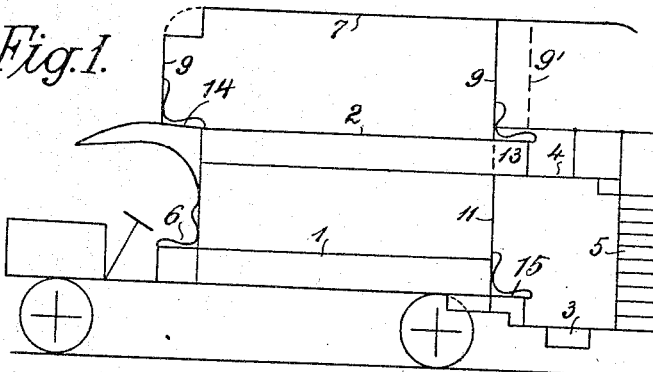
Figure 1 is a sectional side elevation of an autobus embodying the present invention.

The longitudinal benches 2 of the upper deck may terminate at their front ends in transverse benches 14, the floor of the upper deck being cut away under these transverse benches as shown in Figs. 1 and 3. Thereby not only the length of the lateral passageways of the upper deck is further reduced, and the free height above the seats 6 on the front platform of the lower deck is increased, but also the area of the side walls of the upper deck exposed to lateral wind pressure is reduced.
The rear wall 11 of the lower deck may be in a plane with the rear wall 9 of the upper deck, as shown in Fig. 1.

Figure 2:
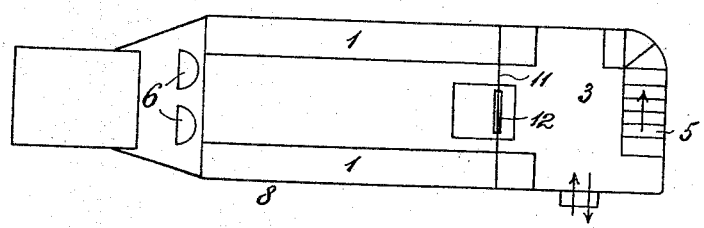
Fig. 2 is a plan of the lower deck.

15 are lateral seats on the platform 3 of the lower deck, which is located at a lower level than the floor of the lower deck proper (the inside) for facilitating ascending; therefore, also, the outside seats 15 are at a lower level and a few steps lead from the platform 3 to the floor of the lower deck proper as clearly shown in Figs. 1 and 2.

In the modifications shown in Figs. 5 to 8, the rear wall 11 of the lower deck is in the same plane with the foot rest of the transverse outside bench 13 of the upper deck, in all other respects this modification is identical with the construction shown in Figs. 1 to 4.

In the modification shown in Figs. 9 to 12, the double bench 2 of the upper deck terminates in front in a transverse bench 16, the length of which is equal to the width of the said double bench. Opposite this bench 16, a transverse bench 17 is provided extending over the whole width of the vehicle; and the two benches are separated by a transverse passageway 18 communicating with the two passageways at the sides of the bench 2. The floor of the upper deck is cut away below the seats of the benches 16 and 17, and in the lower deck a transverse bench 19 connecting the front end of the longitudinal benches 1 is provided directly under the floor of the transverse passageway of the upper deck.

In all other respects, the modification shown in Figs. 9 to 12 is identical with the construction above described. The two transverse benches 16 and 17 with the intervening passageway 18 constitute a transverse compartment in the upper deck. By the arrangement shown in Figs. 9 to 12, the length of the longitudinal benches 2, 2 is notably reduced (all other things being equal) and thereby communication in the same is facilitated without reducing the number of seats. This is particularly important, because the width of the vehicle, and therefore also the width of the lateral passageways of the upper deck, is limited. The transverse passageway 18 of the upper deck may readily be made sufficiently wide, the length of the vehicle not being limited to such an extent as its width.

In the constructions hereinbefore described the passengers enter and leave the vehicle by the rear platform of the lower deck from which start the stairs 5.

In the modification shown in Figs. 13 to 16, a double decked vehicle is shown having the entrance and exit door 12 of the lower deck arranged at the side, the bottom of the lower deck being drawn down between the trucks as far as possible for facilitating ascending. In the upper deck, the longitudinal benches 2 terminate at their front end in a transverse bench 16 extending to the sidewall of the vehicle, in which the door 12 is provided; and moreover the lateral passageway of the upper deck at the same side is terminated by a short transverse bench 20, the floor of the upper deck being cut away below the seats of these transverse benches, and the door 12 being arranged directly under these benches. Opposite the bench 16 another transverse bench 17 is provided and separated from the transverse bench 16 by a transverse passageway 18, below which a transverse bench 19 is provided in the lower deck, as in the modification shown in Figs. 9 to 12, the passageway 18 being, of course, accessible from only one of the longitudinal passageways, viz. that on the side opposite the door 12. The lower deck terminates in a rear platform 21 which may be at a higher level than the floor of the lower deck proper and which may be suitable for seats or for standing room for passengers. The stairs 5 start from the platform 21 to which lead a few steps from the floor of the lower level proper.

In this modification the available space is utilized as perfectly as possible and nevertheless convenient passageways are provided throughout the vehicle.

Referring to the modification shown in Figs. 17 to 21, in the upper deck the transverse benches and the transverse passageway between them are dispensed with; the longitudinal bench 2 at the side of the door 12 is terminated by a short transverse bench or seat 20, as in the modification shown in Figs. 13 to 16, at a convenient distance from the front transverse wall of the upper deck, the floor of the upper deck being cut away below the seat 20, and being conveniently raised between the back of the seat 20 and this front wall of the upper deck, for affording a sufficient clear height of the door 12, which is directly below these parts. The other longitudinal bench 2 of the upper deck terminates in a short transverse bench or seat 14 at the front wall of the upper deck, as in Fig. 3. In the lower deck, the transverse bench is dispensed with. In all other respects the construction shown in Figs. 17 to 21 is identical with that shown in Figs. 13 to 16.

In the modification shown in Figs. 22 to 26 the transverse bench 16 and the transverse passageway 18 in the upper deck and the transverse bench 19 in the lower deck are retained; the transverse bench of the upper deck is, however, dispensed with. In all other respects the construction shown in Figs. 22 to 26 is identical with that shown in Figs. 13 to 16.

Claims:

1. In a double decked car the combination of longitudinal benches at the sides of the lower deck, longitudinal benches having their backs adjacent to each other on the upper deck, whereby a longitudinal passage way is obtained on each side of the pair of benches of the upper deck the floor below such benches on the upper deck being cut away, side walls, transverse walls and a roof for such upper deck, the rear transverse wall being arranged at the end of the two benches of the upper deck and being provided with a separate entrance door for each of the said longitudinal passage ways of the upper deck and a transverse bench outside the said rear wall and between the said doors.

2. In a double decked car the combination of longitudinal benches at the sides of the lower deck, longitudinal benches having their backs adjacent to each other on the upper deck whereby a longitudinal passage way is obtained on each side of the pair of benches of the upper deck the floor below such benches on the upper deck being cut away, side walls, transverse walls and a roof for such upper deck the rear transverse wall being arranged at the end of the two benches of the upper deck and being provided with a separate entrance door for each of the said longitudinal passage ways of the upper deck, a transverse bench at the front end of the pair of benches in the upper deck extending over the width of the latter and another transverse bench opposite the first named transverse bench and extending over the whole width of the upper deck of the vehicle a transverse passage way being left between the two transverse benches.

3. In a double decked car the combination of longitudinal benches at the sides of the lower deck, longitudinal benches having their backs adjacent to each other on the upper deck whereby a longitudinal passage way is obtained on each side of the pair of benches of the upper deck the floor below such benches on the upper deck being cut away, side walls, transverse walls and a roof for such upper deck the rear transverse wall being arranged at the end of the two benches of the upper deck and being provided with a separate entrance door for each of the said longitudinal passage ways of the upper deck, a transverse bench at the front end of the pair of benches in the upper deck extending over the width of the latter and another transverse bench opposite the first named transverse bench and extending over the whole width of the upper deck of the vehicle a transverse passage way being left between the two transverse benches and a transverse bench connecting the longitudinal benches of the lower deck and located below the said transverse passage way of the upper deck.

4. In a double decked car, the combination of longitudinal benches at the sides of the lower deck, longitudinal benches having their backs adjacent to each other on the upper deck whereby a longitudinal passageway is obtained on each side of the pair of benches of the upper deck, the floor below such benches on the upper deck being cut away, side walls, transverse walls, a roof for said upper deck, separate entrances for each of the said longitudinal passageways of the upper deck, a transverse bench at the front end of the pair of longitudinal benches of the upper deck, said transverse bench having the floor cut away under it, and a transverse bench on the lower deck below such passageway.

5. In a double decked car, the combination of longitudinal benches at the sides of the lower deck, longitudinal benches having their backs adjacent to each other on the upper deck whereby a longitudinal passageway is obtained on each side of the pair of benches of the upper deck, the floor below such benches on the upper deck being cut away, side walls, transverse walls, a roof for such upper deck, separate entrances for ecah of the said longitudinal passageways of the upper deck, a transverse bench at the front end of the pair of longitudinal benches of the upper deck, the said transverse bench having the floor cut away under it and being separated from the front wall by a passageway, a transverse bench on the lower deck below such passageway, such last-named transverse bench extending between the longitudinal benches of the lower deck, and a transverse bench on the upper deck having its back to the rear of the vehicle.

6. In a double decked car, the combination of longitudinal benches at the sides of the lower deck, longitudinal benches having their backs adjacent to each other on the upper deck whereby a longitudinal passageway is obtained on each side of the pair of benches of the upper deck, the floor below such benches on the upper deck being cut away, side walls, transverse walls, a roof for such upper deck, the rear transverse wall being arranged at the end of the two benches of the upper deck and being provided with a separate entrance door for each of the said longitudinal passageways of the upper deck, a transverse bench at the front end of the pair of longitudinal benches of the upper deck, the said transverse bench having the floor cut away under it and being separated from the front wall by a passageway, a transverse bench on the lower deck below such passageway, such last-named transverse bench extending between the longitudinal benches of said lower deck, and a transverse bench on the upper deck having its back to the rear of the vehicle and provided with a foot rest, the floor being cut away under such bench and foot rest.

In testimony whereof I affix my signature in presence of two witnesses.

LUDWIG SPÄNGLER.

Witnesses:
  Dr. J. LIPNER,
  AUGUST FUGGER.